United States Patent

[11] 3,614,725

| [72] | Inventor | James H. Moran<br>Danbury, Conn. |
|---|---|---|
| [21] | Appl. No. | 817,410 |
| [22] | Filed | Apr. 18, 1969 |
| [45] | Patented | Oct. 19, 1971 |
| [73] | Assignee | Schlumberger Technology Corporation<br>New York, N.Y. |

[54] CONTINUOUSLY VARIABLE STEERED BEAM TRANSDUCERS FOR ACOUSTIC WELL LOGGING
4 Claims, 5 Drawing Figs.

| [52] | U.S. Cl. | 340/17 |
|---|---|---|
| [51] | Int. Cl. | G01v 1/16 |
| [50] | Field of Search | 340/15.5,<br>17; 181/.5 EP, .5; 333/30 M; 330/29 |

[56] References Cited
UNITED STATES PATENTS

| 2,907,957 | 10/1959 | Dewitz | 333/29 |
|---|---|---|---|
| 3,037,185 | 5/1962 | Dewitz | 333/29 X |
| 3,136,381 | 6/1964 | Anderson | 181/.5 |
| 3,138,219 | 6/1964 | Blizard | 181/.5 |
| 3,425,002 | 1/1969 | Okamura | 333/30 |
| 3,426,865 | 2/1969 | Henry | 340/15.5 |

*Primary Examiner*—Rodney D. Bennett, Jr.
*Assistant Examiner*—Brian L. Ribando
*Attorneys*—Ernest R. Archambeau, Jr., David L. Moseley, Edward M. Roney, William R. Sherman and Stewart F. Moore

ABSTRACT: An illustrative embodiment of the present invention includes directional acoustic transducer apparatus for use in acoustic logging in a well bore for both transmitting and receiving acoustic logging signals. The apparatus utilizes a plurality of piezoelectric acoustic transducer elements and a plurality of inductors wound over permeable cores. The angle of directivity of the acoustic transducer may be remotely and continuously controlled by varying the magnetic bias of the permeable cores by means of a control circuit.

James H. Moran
INVENTOR.

BY William J Beard
ATTORNEY

CONTINUOUSLY VARIABLE STEERED BEAM TRANSDUCERS FOR ACOUSTIC WELL LOGGING

BACKGROUND OF THE INVENTION

The present invention relates to acoustic well-logging apparatus, and more particularly, to control of the directional characteristics of acoustic transmitting and receiving transducers.

Generally, acoustic logging transducers, for transmitting and receiving acoustic signals in a well bore are designed to emit or receive acoustic energy where the maximum amplitude components of the energy are normal to the axis of the transducers. For measurement of the transmission of compressional wave energy, this is acceptable. Shear wave energy (sometimes referred to as "Rayleigh" wave energy) has a distinctly different characteristic, however, and for this measurement it is desirable to emit and detect energy at an acute angle relative to the axis of the transducers. Moreover, it is desired to provide the most optimum angle to obtain the maximum amplitude component of the transmitted signal.

A system for controlling the directional characteristics of acoustic energy is illustrated in a copending U.S. Pat. application Ser. NO. 767,026 and entitled DIRECTIONAL ACOUSTIC TRANSMITTING AND RECEIVING APPARATUS by Adelbert Semmelink, which is assigned to the assignee of the present invention. The system disclosed in the above patent application controls or "steers" the direction of the beam of transmitted energy, by varying the delay of sections in an electrical delay line where the cumulative effect of the delay line is to provide an acoustic energy impulse. The transducer for example, has magnetostrictive elements which form the inductances of an M derived electrical delay line, and by varying the charging voltages on the capacitors in the delay line for directing the beam, the angle of maximum transmitted amplitude of the beam of acoustic energy can be varied. However, changes in charging voltages applied to the capacitors in the delay line for directing the beam change the amplitude of the transmitted wave.

Further, while it has been possible to provide steered receiving transducers utilizing the delay line principle outlined above, such receiving transducers have had fixed steering angles. This has been because the capacitance or the inductance of the delay line sections must be changed in order to alter the delay of a given section of the delay line. Prior to the present invention there has been no practical way to change the steering angle of a receiver.

Accordingly, it is an object of the present invention to provide new and improved apparatus for directional acoustic transmitting and receiving in well-logging systems in which a beam of acoustic energy can be controlled as to direction without substantial loss of amplitude or power in a transmitting transducer or loss of amplitude or power in a transmitting transducer or loss of sensitivity in a receiving transducer.

A further object of the present invention is to provide new and improved directional electroacoustic transducing apparatus in which the angle of directivity for the transmitted acoustic energy can be varied without substantial loss of energy.

A further object of this invention is to provide a new and improved electroacoustic transducers for use in well-logging tools whose directional components of beamed acoustic energy can be controlled remotely from the earth's surface while the transducers are in use in a well bore.

Briefly, in accordance with the objects of the present invention, a well bore acoustic transducer for transmitting or receiving acoustic energy at selectable angles relative to the well tool includes electrically connected, piezoelectric transducer elements longitudinally spaced from each other along the axis of a well tool. Series-connected inductors wound on ferromagnetically permeable cores together with shunt capacitive elements form an electrical delay line of the M- derived type. A control circuit, which includes a secondary winding on the ferromagnetically permeable cores of the inductors, is provided so that the steering angle, (i.e., the angular direction of the received or transmitted energy component of acoustic energy relative to the tool axis) can be continuously varied by increasing or decreasing a DC control current to the control circuit. The DC control current alters the magnetic permeability of the ferromagnetic cores to change the time constant of the delay line without affecting the net energy input to excite the transducer elements.

An important feature of the present invention is the ease of adjustabilty of the steering angle, or angle of directivity, of the acoustic energy which permits continuous variation without affecting the receiving sensitivity or transmitted energy characteristics of the system. Further, the angle of directivity, or steering angle can be adjusted from the earth's surface by varying the DC current flowing in the control circuit including the secondary windings of the inductive elements of the delay line portion of the transducer.

BRIEF DESCRIPTION OF THE DRAWINGS

The novel features of the present invention are set forth with particularity in the appended claims. The operation, together with further objects and advantages of the invention, may be best understood by way of illustration and example of certain embodiments when taken in conjunction with the accompanying drawings, in which:

DESCRIPTION OF THE PREFERRED EMBODIMENTS

Figure 1:
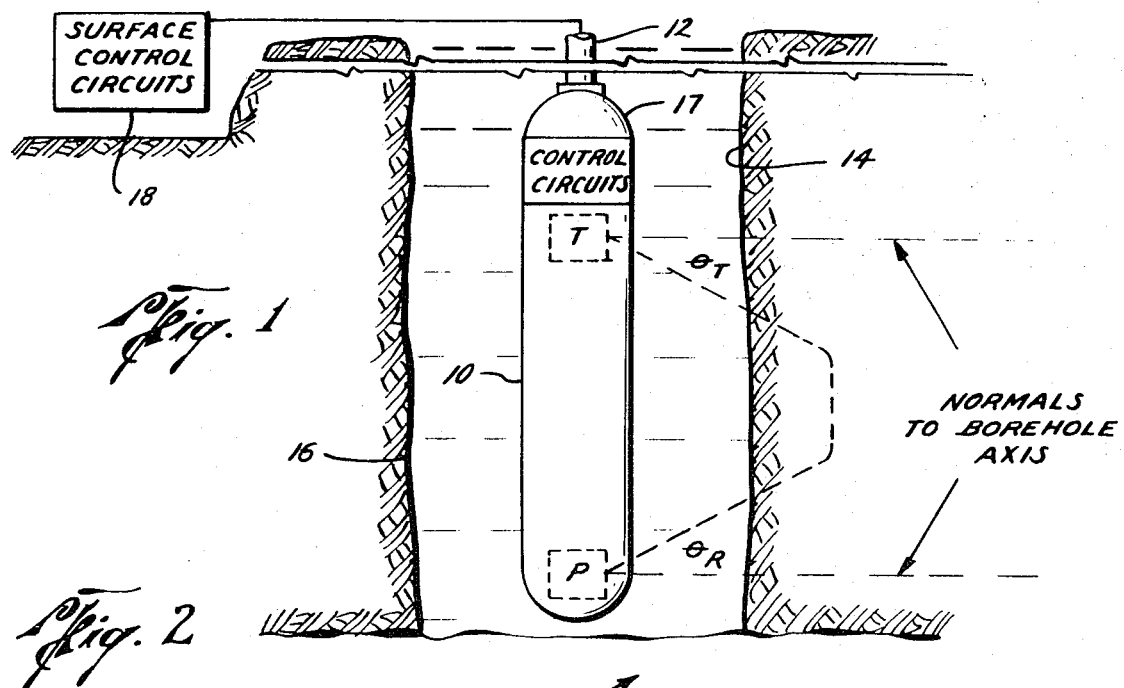
FIG. 1 is a schematic representation of a logging tool in a borehole and indicating the location of transmitting and receiving transducers of a directional controlled character therein.

Referring to FIG. 1, an acoustic well-logging tool 10 is suspended by means of an electric cable 12, in a fluid-filled well bore 14, traversing earth formations 16. The logging tool 10 is moved through the well bore 14 by means of a conventional winch arrangement at the surface (not shown). Cable 12 includes all of the necessary electrical conductors for connecting a surface-located power source of the logging tool and for transmission of signals between the tool and the surface equipment. The tool 10 includes a single acoustic transmitter means T and a single receiver means R, although it will be understood that the present invention is applicable to various arrangements employing a plurality of transmitters and/or receivers.

Several modes of wave energy result from the emission of acoustic energy in a well bore. In the particular application illustrated, it is desired to detect the acoustic energy traveling between a particular transmitter and a particular receiver where the acoustic energy principally follows a path from the transmitter T at an angle $\theta_T$ from the normal, then generally along the borehole wall, and finally back to the receiver R at an angle $\theta_R$. Dependent upon the velocity characteristics of the well fluids and formations as well as the geometry of the tool and well bore, the angles $\theta_T$ and $\theta_R$ can vary in the transmission of energy between the transmitter and receiver. However, if the transmitter and receiver have directional characteristics such that their respective steering angles $\theta_T$ and $\theta_R$, can be adjusted, then optimum output of the transmitter and optimum response of the receiver can be obtained. By optimizing the efficiency of the equipment, detection of weaker Rayleigh signals is greatly enhanced.

Acoustic transducers designed to emit or receive a beam of sonic energy at a directional angle can be referred to as "-steered beam transducers." In copending application, Ser. No. 767,026 entitled DIRECTIONAL ACOUSTIC TRANSMITTING AND RECEIVING APPARATUS by Adelbert Semmelink filed Sept. 6, 1968 and assigned to the assignee of the present invention, a steered beam transducing apparatus is provided through the use of electrical delay lines. This transducer array includes a plurality of longitudinally spaced piezoelectric ceramic elements and/or magnetostrictive transducer elements coupled by an electrical delay line comprised of inductances and shunt capacitances. When transducer elements in such an arrangement are sequentially excited, say from the top to the bottom of the array with a time delay between the excitation of each individual element, then the vector sum of the acoustic wave fronts produced by each transducer element will combine to give a steered-beam ray directed at an angle which is dependent upon the delay between the excitation of the individual elements and their physical spacing.

In the copending application, the steering angle of the beam of the transmitting array may be varied by changing the excitation voltage applied to the individual transducer elements HOwever, if the excitation voltage level is lowered, this results in lowering the energy available for exciting the individual transducer elements and, hence, leads to a loss in amplitude or energy of a transmitting array of this type. Further, in receiving arrays of this type, the steering angle previously could only be altered by changing the circuit parameters L and C (i.e., inductance and capacitance of the delay line circuit) in order to vary the delay between the receiver elements or by changing the physical spacing of the elements themselves. Since neither of the parameters could readily be adjusted exterior to the borehole, it has been impractical until now to provide the ability to simultaneously and continuously vary both the transmitting and receiving steering angles by controls exterior to the borehole on such receiving transducers.

Figure 2:
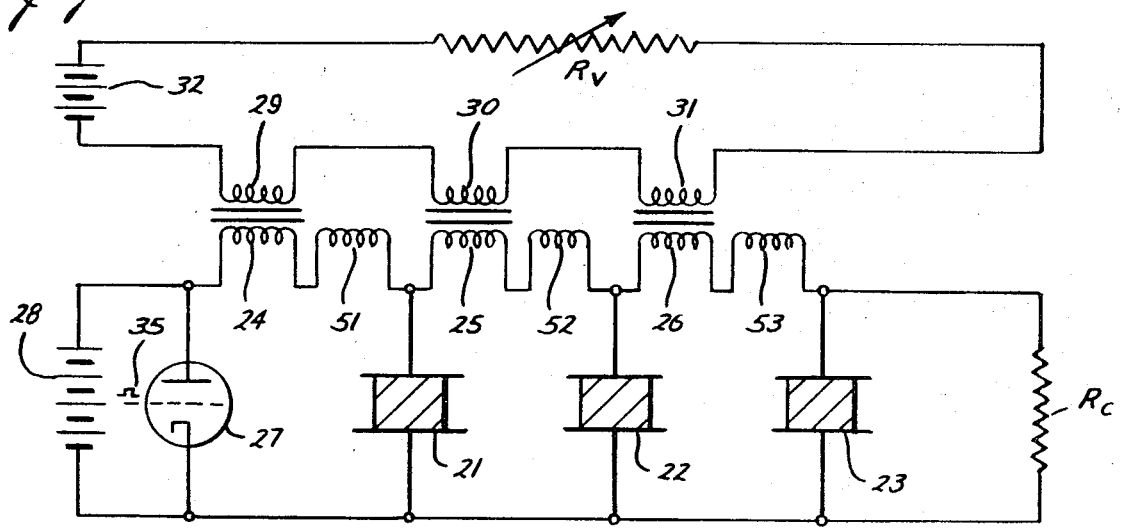
FIG. 2 is a schematic electrical diagram illustrating circuitry which may be used in a transmitting transducer in accordance with the present invention.

In FIG. 2, The present invention is shown embodied in a schematic circuit diagram. The transducer array for transmitting steered-beam acoustic energy includes a plurality of piezoelectric ceramic transducer elements 21, 22, and 23 which constitute individual elements of the transducer assembly. Although only three such elements are shown in the schematic circuit illustration, it will be understood that any number of such elements necessary to achieve a desired amplitude may be utilized. These transducer elements are preferably short, hollow, cylindrical-shaped members, and are spaced longitudinally from each other along the axis of the tool. Elements 21, 22, and 23 may be made of a suitable ceramic piezoelectric material such as lead titanate zirconate or the like. The ceramic piezoelectric transducer elements 21, 22, and 23 together with series variable inductors 24, 25, 26 wound over ferromagnetic cores together with constant inductors 51, 52, and 53 form an electrical delay line of the M-derived type.

Figure 2A:
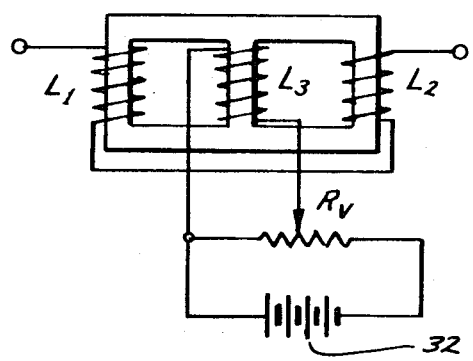
FIG. 2A is a circuit diagram showing how the inductor of FIGS. 2 or 3 may be wound to avoid coupling AC into the control circuit.

Inductors 24, 25, 25, and 34 which carry AC current upon firing the transmitting transducer, as will be subsequently discussed, are wound in such a manner as to couple little or no AC energy into the control circuit coils 29, 30, 31. This maybe accomplished, for example, by winding the inductors 24, 25, 26, and 34 as in the configuration shown in FIG. 2A. Here one of the delay line inductors 24, 25, 26 is shown wound on a three-legged permeable core. Coils $L_1$ and $L_2$ together comprise the delay line inductor while coil $L_3$ represents the associated control circuit coils 29, 30, 31.

The control winding coil $L_3$ is wound in such a fashion that no transformer action occurs. The arrangement of windings $L_1$ and $L_2$ is such that the magnetic flux cancels at the center leg of the core and, therefore, there is no induced voltage set up in the control winding by the magnetic flux induced in the core when AC flows in coils $L_1$ and $L_2$. Further, the relative polarity of the DC control voltage applied to the coil $LH_3$ does not affect the voltages in the transducer circuit because the control winding flux opposes the flux induced in one delay line inductance winding, say $L_1$ while aiding that in the other delay line inductance winding $L_2$ at any given instant. HOwever, the magnitude of the current in the control winding regulates the amount of magnetizing force applied the permeable core and, hence, affects the permeability of the core as will be discussed.

It will be appreciated by those skilled in the art that maximum energy output from such a transmitting transducer array will be achieved at the mechanical resonance frequency of the cylindrical piezoelectric elements 21, 22, and 23 if the circuit values are such that the electrical resonance frequency ($F_R = 1/2\pi\sqrt{LC}$) of the delay line sections is the same as the mechanical resonance frequency of the piezoelectric transducer elements. Since the mechanical resonance frequency of the transducer elements is determined by their physical dimensions and is known, then the value of inductance of fixed inductors 51, 52, and 53 can be chosen to optimize the efficiency of the circuit by making the electrical resonance frequency of the delay line sections correspond to the mechanical resonance of the piezoelectric elements. Thus, by appropriate selection of the values of fixed inductors 51, 52, and 53 the electrical resonance frequency of the delay line sections can be maintained somewhat near the mechanical resonance frequency of the transducer elements even though it will be, of course, changed slightly by the steering effect of the change of inductance of the variable inductors 24, 25, 26. This same method may be used in an acoustic receiver such as that of FIG. 3 to optimize the sensitivity of the receiver and this function is performed in the receiver circuit of FIG. 3 by fixed inductors 86, 87, and 88.

A battery 28, or any convenient high-voltage DC source can supply energy to the piezoelectric ceramic transducer elements. The elements can be triggered by a cold cathode thyratron 27, which may be a Bendix type TD 28 or the like, or other appropriate switching means. A steering control circuit for the system includes a DC current source, such as a battery 32 or the like, a variable control resistor $R_r$, and secondary windings 29, 30, and 31 wound over the ferromagnetic cords.

Directional characteristics for the transmitting transducer array are obtained in the following manner. The high-voltage source 28 supplies a DC charging current through the series inductances and a terminating resistor $R_c$ to charge the capacitances furnished by piezoelectric ceramic elements 21, 22, and 23 until all elements have charged to approximately the voltage level $V_0$ of the charging source. To fire the transmitting transducer, a conventional pulse generator means is used to supply a positive triggering pulse 35 to the control grid of thyratron 27. The positive triggering pulse is supplied by conventional control circuitry 17 which may be located in the upper portion of the sonde 10. Circuitry 17, in turn, can be commanded to operate by signals sent down the cable 12 from the surface control unit 18. This type of control of acoustic transducers is well known in the art. For example, a triggering system may be used as disclosed in U.S. Pat. No. 3,304,537, which is assigned to the assignee of the present invention. In typical acoustic logging applications such an acoustic transmitter may be fired 20 times per second by such control circuitry so as to provide a smooth and continuous appearing log.

When the trigger pulse appears on the grid of thyratron 27 the tube conducts. The voltage at point A suddenly drops to the reference level, and, at this time, the piezoelectric ceramic element 21 discharges through the inductors 24 and 51. The sudden discharge produces a mechanical deformation of the piezoelectric material and the resultant generation of an acoustic impulse from the transducer element. When transducer element 21 discharges, the voltage at point B reaches the reference level momentarily causing a large voltage drop across the second set of inductors 25 and 52. This causes the next piezoelectric element 22 to discharge discharge through its corresponding series inductors 25 and 52. This process repeats itself for each inductor-piezoelectric element pair in the device. The vector sum of the acoustic wave fronts from the individual elements combine to form a total output from the assembly whose angle of directivity is dependent on the delay between the discharge of the individual elements and by their physical spacing.

The electrical delay time $t_D$ introduced by the delay line nature of the arrangement between each individual section is given by the relation:

$t_D = m\sqrt{LC}$  (1) where $L$ is the value of the inductance and $C$ the value of the capacitance of each element of the delay line section. The parameter "m" is a design parameter which depends on the physical construction of the delay line and relates to the mutual inductance of the inductors used in the delay line. By varying the delay time, the vector sum of the acoustic wave fronts produced by the individual transducer elements will combine to change the angle of the main lobe of the acoustic energy beam with respect to the borehole axis. From equation (1), it will be appreciated that the delay and hence the steering angle may be varied by changing the inductance values $L$ in the array. This is effected by varying the magnetic permeability of the cores of inductors 24, 25, 26.

Figure 4:
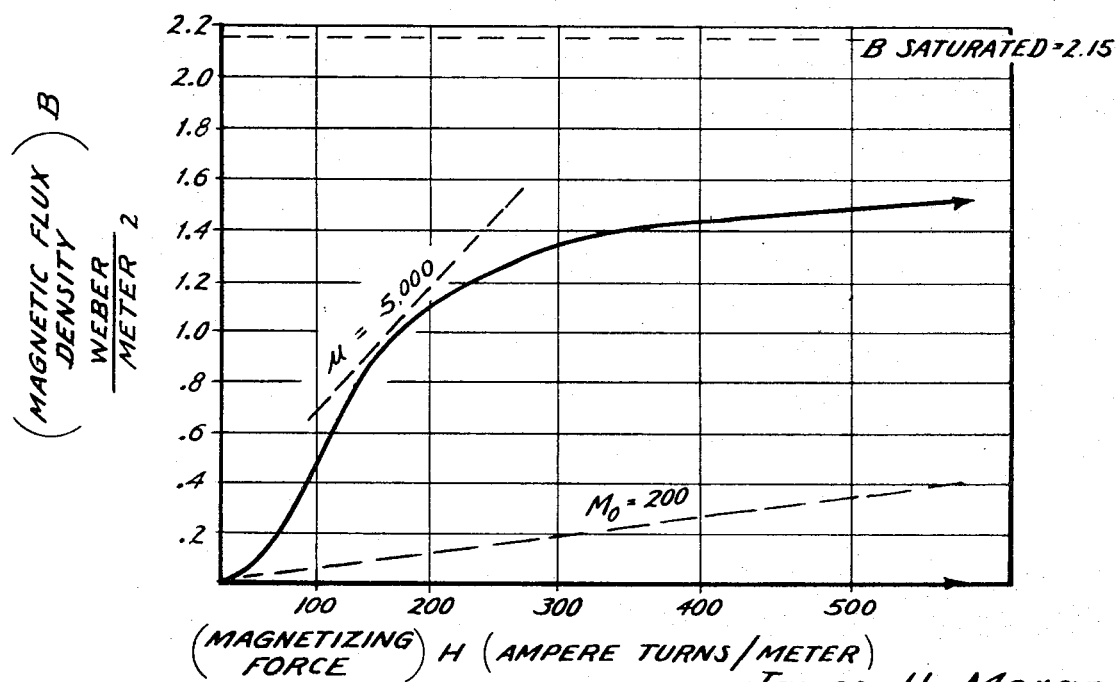
FIG. 4 is a graph illustrating a typical change in the magnetic permeability of a ferromagnetic material with the change of a DC control current in a winding about the material.

As shown in FIG. 4, (a plot of B vs. H) a change in the permeability (i.e., the slope of the B vs. H curve) of a magnetic material, such as annealed iron, may be accomplished by varying the magnetizing force H which induces the magnetic baising field B in the core. When the DC control current to secondary windings 29, 30, 31 of the and DC current is increased thus increasing the bias magnetizing force the surface the permeability of the cores changes from an initial value of approximately 200 to a maximum value of about 5,000 and then decreases as the control current approaches saturation of the core. By varying the control circuit resistance using resistor $R_r$, or the like, the DC current through the secondary windings 29, 30, 31 of the inductors may be increased or decreased and the magnetic permeability of the inductor cores is changed. The change in magnetic permeability will correspondingly alter the delay characteristics of the delay line. Resistor $R_r$ and DC current supply 32 may be conveniently located at the surface for remote control of the steering angle.

Figure 3:
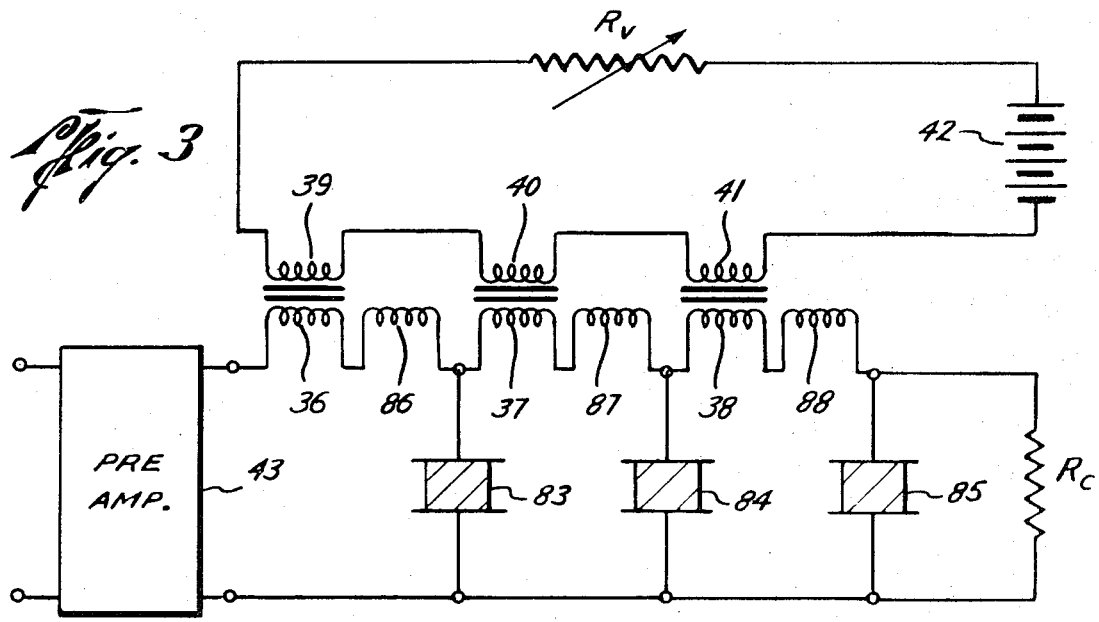
FIG. 3 is a schematic electrical diagram illustrating circuitry which may be used in a receiving transducer according to the present invention.

In FIG. 3, a receiving transducer utilizing this principle is illustrated. In a receiving transducer, as schematically shown, a plurality of hollow, cylindrically shaped, piezoelectric, ceramic transducer elements 83, 84, and 85 can be disposed at longitudinally spaced positions along a tool axis. Although only three such elements are shown, any suitable number may be used to achieve the desired receiving sensitivity. The elements are interconnected by inductors 36, 37, 38, and 45 which are wound over ferromagnetic cores and have control windings 39, 40, 41. Series inductors 86, 87, and 88 are included to preserve resonance characteristics as previously discussed. Inductors 36, 37, 38, 86, 87 and 88 together with piezoelectric ceramic elements 83, 84, and 85 constitute a delay line of the M-derived type whose delay time per section is similarly given by equation (1). A control circuit utilizing a DC current source 42 and a variable resistor $R_r$, or the like, can be utilized to vary the magnetic permeability of the cores of the inductors and thereby alter the inductance of inductors 36, 37, 38 and thereby the preferred angle of reception of the device. The control portion of the circuit may be suitably located at the surface as previously discussed.

Mechanical deformation of the piezoelectric elements by impinging acoustic waves generates electrical signals from the individual piezoelectric elements which are coupled to preamplifier 43, but which are sequentially delayed by the delay line action of the piezoelectric ceramic element capacitances 83, 84 and 85 and the inductors 36, 37, 38, 86, 87, and 88. The preferred angle of reception of such an array is determined by the physical spacing of the elements from each other, together with the values $L$ and $C$ of the delay line as given by equation ((1). The DC current source 42 and variable resistor $R_r$ may be located at the surface for convenient control of the device.

Although in the embodiment shown only one transmitter receiver pair is utilized it will be appreciated by those skilled in the art that for certain acoustic logging applications it may be desirable to include plural transmitters and/or receivers of the type of the present invention. This is contemplated to be within the scope of the present invention as are other obvious modifications which may be apparent to workers skilled in the art.

While a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Electroacoustic transducer means for use in a fluid-filled well bore comprising:
   a plurality of individual piezoelectric transducer elements disposed longitudinally of one another along an axis and sized to permit passage through a well bore;
   a first plurality of inductors wound over permeable cores and in one-to-one association with said transducer elements;
   a second plurality of inductors connected in series relationship and in one-to-one association with said first plurality of inductors, said inductors and said transducer elements forming an electrical delay line the value of inductance of each of said second plurality of inductors when taken together with that of the associated inductor of said first plurality of inductors being such as to optimize the condition for resonance of the inductor-piezoelectric transducer element delay line in a selected frequency range corresponding to the mechanical resonance frequency of said transducer elements; and
   means for controlling the magnetic permeability of said cores so as to control the value of inductance of said first plurality of inductors.

2. An electroacoustic transmitting transducer defined as in claim 1, further comprising;
   means for supplying electrical energy to be stored in said transducer elements; and
   means for triggering the release of said stored electrical energy from said transducer elements.

3. The apparatus of claim 1, wherein said means for controlling the magnetic permeability of the cores about which said first plurality of inductors are wound includes control windings about each of said cores and control circuit means for supplying selected DC currents to said control windings thereby providing a controlled magnetic biasing of said cores.

4. Acoustic well-logging transducer apparatus comprising:
   a plurality of individual capacitive piezoelectric transducer elements disposed longitudinally of one another along a longitudinal axis and sized to permit passage through a well bore;
   a first plurality of inductors wound over permeable cores and in one-to-one association with said transducer elements;
   a second plurality of inductors connected in series relationship and in one-to-one association with said first plurality of inductors so as to provide a delay line for sequentially controlling the activation of said capacitive transducer elements in a manner which cumulatively defines a beam of acoustic energy at an angle relative to said longitudinal axis of the transducer array, the value of inductance of each of said additional plurality of inductors when taken together with that of its associated inductor of said first plurality of inductors being such as to optimize the condition for resonance of the inductor-piezoelectric element delay line in a selected frequency range corresponding to the mechanical resonance frequency of said piezoelectric transducer elements; and
   remotely operable means for varying the magnetic permeability of said cores so as to vary the relative angle of said beam of acoustic energy with respect to said longitudinal axis.